(12) United States Patent
Scheid

(10) Patent No.: US 10,290,160 B2
(45) Date of Patent: May 14, 2019

(54) VEHICLE DATA COLLECTION SYSTEM AND METHOD

(71) Applicant: United Technologies Corporation, Farmington, CT (US)

(72) Inventor: Paul Raymond Scheid, West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 147 days.

(21) Appl. No.: 15/344,644

(22) Filed: Nov. 7, 2016

(65) Prior Publication Data

US 2018/0130270 A1    May 10, 2018

(51) Int. Cl.
| | | |
|---|---|---|
| *G07C 5/08* | (2006.01) | |
| *G07C 5/00* | (2006.01) | |
| *B64F 5/00* | (2017.01) | |
| *G06Q 10/08* | (2012.01) | |
| *G06Q 10/10* | (2012.01) | |
| *G06Q 50/04* | (2012.01) | |
| *G06Q 50/30* | (2012.01) | |
| *B64F 5/60* | (2017.01) | |
| *B64D 45/00* | (2006.01) | |

(52) U.S. Cl.
CPC ............... *G07C 5/085* (2013.01); *B64F 5/60* (2017.01); *G06Q 10/0875* (2013.01); *G06Q 10/101* (2013.01); *G06Q 50/04* (2013.01); *G06Q 50/30* (2013.01); *G07C 5/008* (2013.01); *B64D 2045/0085* (2013.01); *Y02P 90/30* (2015.11)

(58) Field of Classification Search
CPC ........... G07C 5/085; G07C 5/008; B64F 5/60; B64D 2045/0085; G06Q 10/0875; G06Q 50/30; G06Q 50/04; G06Q 10/101; Y02P 90/30
USPC ........................................................ 701/29.6
See application file for complete search history.

(56) References Cited

U.S. PATENT DOCUMENTS

| | | |
|---|---|---|
| 2013/0138467 A1 | 5/2013 | Small et al. |
| 2014/0121861 A1* | 5/2014 | Mood ................. G06F 9/44505 701/3 |
| 2014/0282467 A1 | 9/2014 | Mueller et al. |
| 2015/0309784 A1 | 10/2015 | Molin et al. |
| 2015/0347326 A1 | 12/2015 | Pandya et al. |

OTHER PUBLICATIONS

Eurpoean Search Report Issued in EP Application No. 17200180.2, dated Feb. 19, 2018, 8 Pages.

* cited by examiner

*Primary Examiner* — Brian P Sweeney
(74) *Attorney, Agent, or Firm* — Cantor Colburn LLP

(57) ABSTRACT

A method of data collection for a vehicle includes defining a first data acquisition definition file at a data collection and reporting hub based on a first vehicle build configuration, the first vehicle build configuration based on first individual build configurations of one or more vehicle systems, and the first data acquisition definition file including parameters and measurements to be performed by a data acquisition system disposed at the vehicle. The first vehicle build configuration is changed to a second vehicle build configuration, and the first data acquisition definition file is automatically updated to a second data acquisition definition file corresponding to the second vehicle build configuration via the data collection and reporting hub.

19 Claims, 2 Drawing Sheets

VEHICLE DATA COLLECTION SYSTEM AND METHOD

BACKGROUND

The present disclosure relates to vehicles and vehicle systems, and more particularly to data collection and reporting from vehicle and vehicle systems.

Vehicle original equipment manufacturers (OEMs), such as aircraft manufacturers or engine manufacturers, collect data from their equipment in service during the equipment operation by users to monitor health of the equipment and to, for example, make design improvements based on the collected data. To collect the desired data, OEM's define OEM vehicle data reports. Vehicle operators, such as airlines or cargo companies, similarly define operator data reports to understand the health of their fleet of vehicles.

The vehicles include systems such as engines, operational control systems, etc., that are operated via software installed at computers operably connected to the systems. The computers periodically receive software updates while the vehicle is in the field, and many times these software changes affect the operational status and health monitoring data collected and reported in the data reports, reducing the accuracy and usefulness of the collected data and the data reports.

Currently, when software updates are performed to vehicle systems, manual operations are necessary to ensure the data reports are configured to match the software configuration onboard the vehicle and read by the vehicle systems, so that the data is correctly collected and reported. For example, contents of health reports are typically manually reviewed to determine what changes are necessary based on a new vehicle configuration.

SUMMARY

In one embodiment, a method of data collection for a vehicle includes defining a first data acquisition definition file at a data collection and reporting hub based on a first vehicle build configuration, the first vehicle build configuration based on first individual build configurations of one or more vehicle systems, and the first data acquisition definition file including parameters and measurements to be performed by a data acquisition system disposed at the vehicle. The first vehicle build configuration is changed to a second vehicle build configuration, and the first data acquisition definition file is automatically updated to a second data acquisition definition file corresponding to the second vehicle build configuration via the data collection and reporting hub.

Additionally and alternatively, in this or other embodiments the method includes communicating the second data acquisition definition file to a data acquisition system at the vehicle and collecting data at the vehicle based on the second data acquisition definition file.

Additionally and alternatively, in this or other embodiments the method includes detecting the change from the first vehicle build configuration to the second vehicle build configuration at the data collection and reporting hub and automatically changing the first data acquisition definition file to the second data acquisition definition file based on the detected change.

Additionally and alternatively, in this or other embodiments the method includes producing a list of recommended changes to the first data acquisition definition file at the data collection and reporting hub to produce the second data acquisition definition file.

Additionally and alternatively, in this or other embodiments the method includes reviewing the list of recommended changes at the data collection and reporting hub.

Additionally and alternatively, in this or other embodiments the method includes accepting or rejecting individual changes of the recommended changes at the data collection and reporting hub.

Additionally and alternatively, in this or other embodiments the automatically updating the first data acquisition definition file to a second data acquisition definition file is accomplished via an artificial intelligence module at the data collection and reporting hub.

Additionally and alternatively, in this or other embodiments the one or more vehicle systems include one or more of an engine system, an auxiliary power unit system, an environmental control system, a flight control system, and/or a hydraulic system.

Additionally and alternatively, in this or other embodiments the first vehicle build configuration is defined by hardware and/or software versions located at the one or more vehicle systems.

Additionally and alternatively, in this or other embodiments the vehicle is an aircraft.

In another embodiment, a data collection and reporting system for a vehicle includes a data acquisition system located at a vehicle configured to detect a vehicle build configuration based on individual build configurations of one or more vehicle systems of the vehicle and a data collection and reporting hub having a first data acquisition definition file defined thereat corresponding to a first vehicle build configuration. The first data acquisition definition file includes parameters and measurements to be performed by a data acquisition system located at the vehicle. The data collection and reporting hub is configured to automatically change the first data acquisition definition file to a second data acquisition definition file upon detecting a change in vehicle build configuration from the first vehicle build configuration to a second vehicle build configuration.

Additionally and alternatively, in this or other embodiments the data collection and reporting hub is configured to communicate the second data acquisition definition file to the data acquisition system at the vehicle. The data acquisition collects data at the vehicle is based on the second data acquisition definition file.

Additionally and alternatively, in this or other embodiments the data collection and reporting hub is configured to produce a list of recommended changes to the first data acquisition definition file to produce the second data acquisition definition file.

Additionally and alternatively, in this or other embodiments the list of recommended changes is reviewed at the data collection and reporting hub.

Additionally and alternatively, in this or other embodiments individual changes of the recommended changes are rejected or accepted at the data collection and reporting hub.

Additionally and alternatively, in this or other embodiments the automatically updating the first data acquisition definition file to a second data acquisition definition file is accomplished via an artificial intelligence module at the data collection and reporting hub.

Additionally and alternatively, in this or other embodiments the one or more vehicle systems include one or more of an engine system, an auxiliary power unit system, an environmental control system, a flight control system, and/or a hydraulic system.

Additionally and alternatively, in this or other embodiments the first vehicle build configuration is defined by hardware and/or software versions located at the one or more vehicle systems.

Additionally and alternatively, in this or other embodiments the vehicle is an aircraft.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
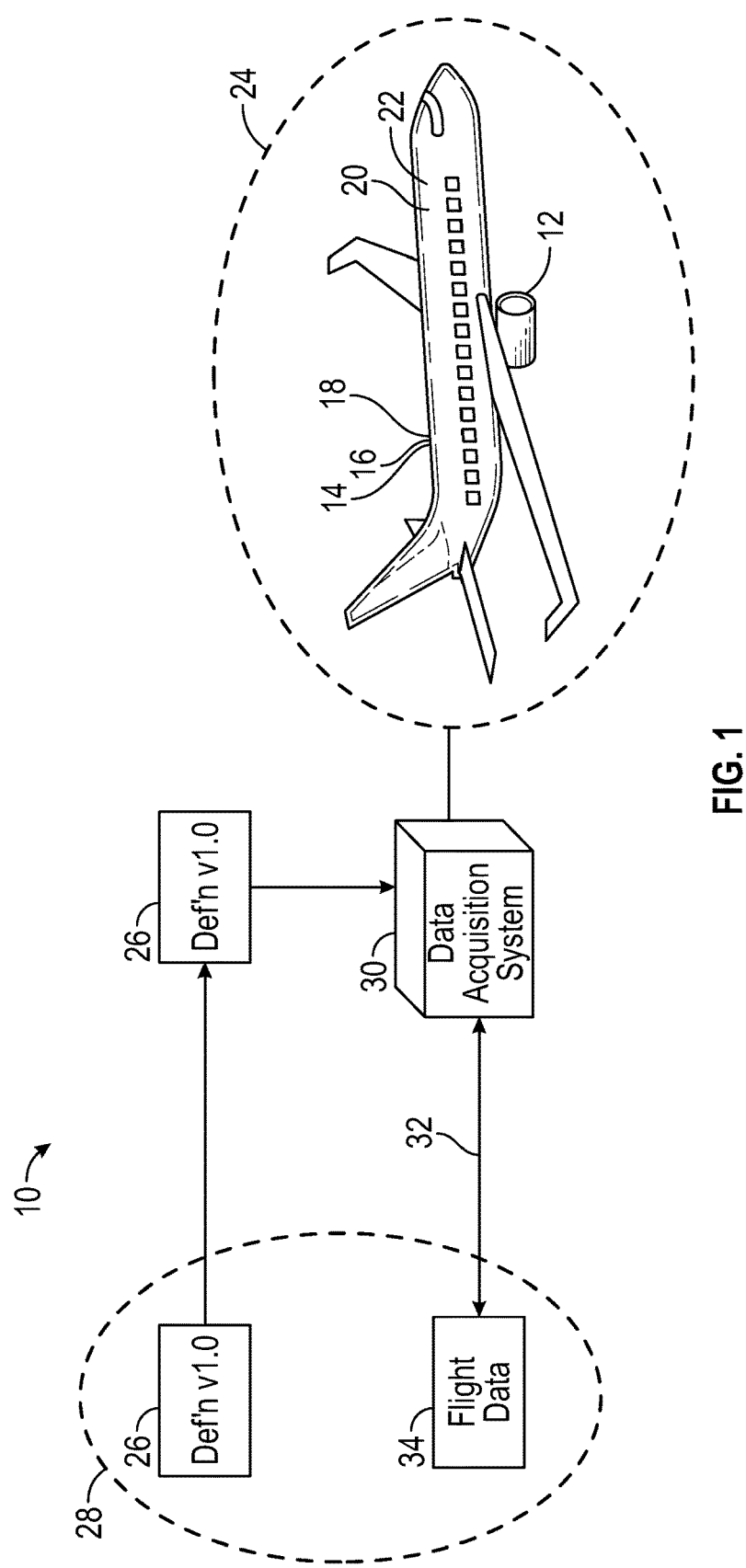
FIG. 1 is a schematic illustration of a data collection and reporting system.

Shown in FIG. 1 is a schematic view of a vehicle health data collection system 10. The data collection system 10 collects and reports system data from one or more systems of a vehicle, for example, aircraft 12. While the description provided herein is in the context of an aircraft 12, one skilled in the art will readily appreciate that the present disclosure may be readily applied to other vehicles, for example, automobiles, trucks, locomotives or trains, ships or other vehicles. The vehicle systems include, for example, engine systems 14, auxiliary power unit systems 16, environmental control systems 18, flight control systems 20, and/or hydraulic systems 22. It is to be appreciated that these vehicle systems are merely exemplary, and the reported system data may include data from other vehicle systems.

The configuration of each system, both hardware and software, defines a system build configuration for each particular vehicle system, while a collection of these system build configurations in the aircraft 12 together define a vehicle build configuration 24. For a particular vehicle build configuration 24, a data acquisition definition file 26 is defined based on input from, for example, design, structural, and performance engineers. The data acquisition definition file 26 specifies what vehicle system data is to be collected and defines report structures for reporting of the vehicle system data.

The data acquisition definition file 26 is defined at a data collection and reporting hub 28, and is communicated to a data acquisition system 30 onboard the aircraft 12. The data collection and reporting hub 28 is connected to communicate with the aircraft 12, specifically with the data acquisition system 30 via a two-way electronic connection 32 with the aircraft 12. In some embodiments, the electronic connection 32 is wireless via, for example, a Wi-Fi or cellular connection or similarly capable wireless technology. The data acquisition system 30 is connected to the other vehicle systems, such as the engine systems 14, auxiliary power unit systems 16, environmental control systems 18, flight control systems 20, and/or hydraulic systems 22 and collects data therefrom as defined by the data acquisition definition file 26.

Through the collection of data per the data acquisition definition file 26, the data acquisition system 30 generates one or more flight data files 34 which are communicated to the data collection and reporting hub 28 via the two-way electronic connection 32.

Periodically, one or more of the vehicle systems are changed or updated, either via changes in hardware and/or changes in software. The system and method for coordinating the vehicle build configuration 24 with the data acquisition definition file 26 when the one or more vehicle systems are changed or updated will now be described by way of example, with reference to FIG. 2.

Figure 2:
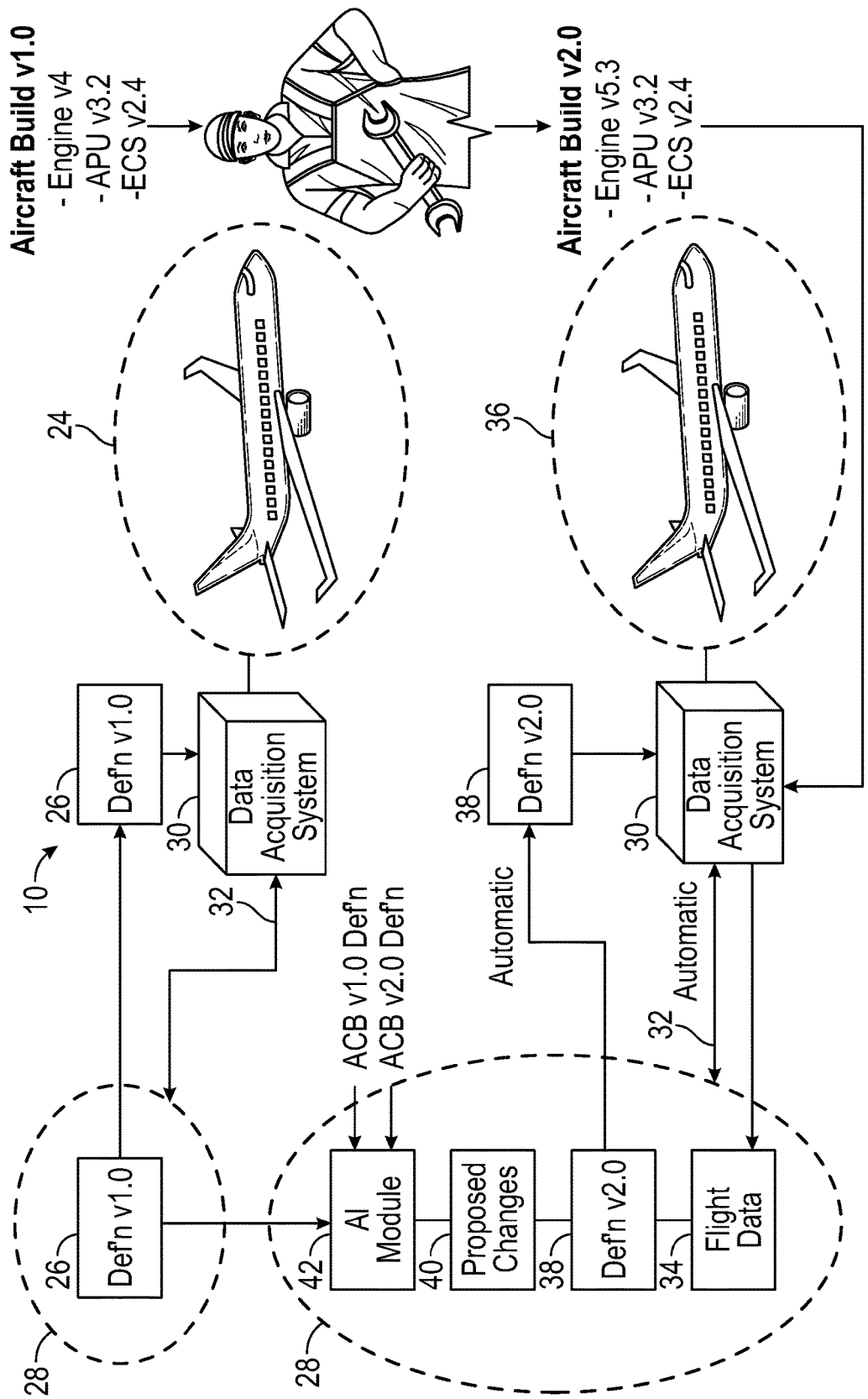
FIG. 2 is a schematic illustration of a method for updating the data collection and reporting system.

In the example shown in FIG. 2, as a baseline configuration the vehicle build configuration 24 is v1.0, as is the data acquisition definition file 26. One or more of the vehicle systems are updated, in this example, the engine systems 14 from engine v4.1 to engine v5.3 by a mechanical and/or software change to the engine systems 14. This operation is performed by, for example, a mechanic or other personnel at the vehicle 12. This change to the engine systems 14 drives a change from vehicle build configuration 24 v1.0 to updated vehicle build configuration 36 v2.0.

The data collection and reporting hub 28 recognizes a change to vehicle build configuration 36 simultaneous with, or either before or after the update to vehicle build configuration 36. The data collection and reporting hub 28 automatically reviews the changes to the vehicle systems causing the update to vehicle build configuration 36 and the data acquisition definition file 26, and automatically generates a proposed updated v2.0 data acquisition definition file 38, along with a listing of proposed changes 40 from the v1.0 data acquisition definition file 26 to the updated v2.0 data acquisition definition file 38. The proposed updated data acquisition definition file 38 corresponds to vehicle build configuration 36 v2.0, and resides at the data collection and reporting hub 28.

Once the proposed updated data acquisition definition file 38 is created, engineers or other personnel may review the listing of proposed changes 40 and either accept or reject each of the proposed changes and finalize the updated data acquisition definition file 38. Alternatively or in tandem, the update of the data acquisition definition file 26 to data acquisition definition file 38 is performed by an artificial intelligence module 42, potentially eliminating a need for review of the listing of proposed changes 40 by engineers or other personnel.

Once a mechanic or other personnel updates the one or more vehicle systems driving the change of vehicle build configuration 24 to vehicle build configuration 36, the data acquisition system 30 recognizes this change and communicates with the data collection and reporting hub 28 via the two-way electronic connection 32, and requests data acquisition data file 38 corresponding to the vehicle build configuration 36, v2.0. If the data acquisition definition file 38 v2.0 exists at the data collection and reporting hub 28, the data acquisition system 30 pulls the data acquisition definition file 38 v2.0 from the data collection and reporting hub 28 for use in collection of data from the vehicle systems.

In some embodiments, when the data collection and reporting hub 28 detects a change in the vehicle build configuration 36, the updated data acquisition definition file 38 is automatically transmitted or "pushed" to the data acquisition system 30 for use by the data acquisition system 30.

Alternatively, if the necessary data acquisition definition file 38 does not exist at the data collection and reporting hub 28, the data acquisition system 30 may communicate an alert to the data collection and reporting hub 28 communicating that the current vehicle build configuration 36 does not have a corresponding data acquisition definition file 38 available for use. This alert may prompt a user to either provide the correct data acquisition definition file 38, stop collection of data, proceed with data collection using an available data acquisition definition file 26, or to take other action in response to the alert.

This method and system for updating the data acquisition definition file 26 utilized at the data acquisition system 30 by the data acquisition system 30 detecting a change in the vehicle build configuration 24, determining that the change to the vehicle build configuration 24 may require an updated data acquisition definition file 26 to be compatible with the updated vehicle build configuration 36, and requesting the updated data acquisition definition file 38 automatically from the data hub 28 removes a need to manually update the data acquisition system 30, resulting in more accurate data collection by the data acquisition system 30 and the provision of more useful data to the OEM, vehicle operator, or other requesting parties.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A method of data collection for a vehicle comprising:
defining a first data acquisition definition file at a data collection and reporting hub based on a first vehicle build configuration, the first vehicle build configuration based on first individual build configurations of one or more vehicle systems, and the first data acquisition definition file including parameters and measurements to be performed by a data acquisition system disposed at the vehicle;
changing the first vehicle build configuration to a second vehicle build configuration; and
automatically updating the first data acquisition definition file to a second data acquisition definition file corresponding to the second vehicle build configuration via the data collection and reporting hub.

2. The method of claim 1, further comprising:
communicating the second data acquisition definition file to a data acquisition system at the vehicle; and
collecting data at the vehicle based on the second data acquisition definition file.

3. The method of claim 1, further comprising:
detecting the change from the first vehicle build configuration to the second vehicle build configuration at the data collection and reporting hub; and
automatically changing the first data acquisition definition file to the second data acquisition definition file based on the detected change.

4. The method of claim 1, further producing a list of recommended changes to the first data acquisition definition file at the data collection and reporting hub to produce the second data acquisition definition file.

5. The method of claim 4, further comprising reviewing the list of recommended changes at the data collection and reporting hub.

6. The method of claim 5, further comprising accepting or rejecting individual changes of the recommended changes at the data collection and reporting hub.

7. The method of claim 1, wherein the automatically updating the first data acquisition definition file to a second data acquisition definition file is accomplished via an artificial intelligence module at the data collection and reporting hub.

8. The method of claim 1, wherein the one or more vehicle systems include one or more of an engine system, an auxiliary power unit system, an environmental control system, a flight control system, and/or a hydraulic system.

9. The method of claim 1, wherein the first vehicle build configuration is defined by hardware and/or software versions disposed at the one or more vehicle systems.

10. The method of claim 1, wherein the vehicle is an aircraft.

11. A data collection and reporting system for a vehicle comprising:
a data acquisition system disposed at a vehicle configured to detect a vehicle build configuration based on individual build configurations of one or more vehicle systems of the vehicle;
a data collection and reporting hub having a first data acquisition definition file defined thereat corresponding to a first vehicle build configuration, the first data acquisition definition file including parameters and measurements to be performed by a data acquisition system disposed at the vehicle;
wherein the data collection and reporting hub is configured to automatically change the first data acquisition definition file to a second data acquisition definition file upon detecting a change in vehicle build configuration from the first vehicle build configuration to a second vehicle build configuration.

12. The data collection and reporting system of claim 11, wherein the data collection and reporting hub is configured to communicate the second data acquisition definition file to the data acquisition system at the vehicle;
wherein the data acquisition collects data at the vehicle based on the second data acquisition definition file.

13. The data collection and reporting system of claim 11, wherein the data collection and reporting hub is configured to produce a list of recommended changes to the first data acquisition definition file to produce the second data acquisition definition file.

14. The data collection and reporting system of claim 13, wherein the list of recommended changes is reviewed at the data collection and reporting hub.

15. The data collection and reporting system of claim 11, wherein individual changes of the recommended changes are rejected or accepted at the data collection and reporting hub.

16. The data collection and reporting system of claim 11, wherein the automatically updating the first data acquisition definition file to a second data acquisition definition file is accomplished via an artificial intelligence module at the data collection and reporting hub.

17. The data collection and reporting system of claim 11, wherein the one or more vehicle systems include one or more of an engine system, an auxiliary power unit system, an environmental control system, a flight control system, and/or a hydraulic system.

18. The data collection and reporting system of claim 11, wherein the first vehicle build configuration is defined by hardware and/or software versions disposed at the one or more vehicle systems.

19. The data collection and reporting system of claim 11, wherein the vehicle is an aircraft.

\* \* \* \* \*